United States Patent
Mohan et al.

(10) Patent No.: US 12,074,462 B2
(45) Date of Patent: *Aug. 27, 2024

(54) WIRELESS CHARGING DEVICE, A RECEIVER DEVICE, AND AN ASSOCIATED METHOD THEREOF

(71) Applicant: GE Intellectual Property Licensing, LLC, Niskayuna, NY (US)

(72) Inventors: Sivabalan Mohan, Bangalore (IN); Rajendra Naik, Bangalore (IN); Arun Kumar Raghunathan, Bangalore (IN); Somakumar Ramachandrapanicker, Bangalore (IN)

(73) Assignee: GE Intellectual Property Licensing, LLC, Niskayuna, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/820,058

(22) Filed: Aug. 16, 2022

(65) Prior Publication Data

US 2022/0393519 A1 Dec. 8, 2022

Related U.S. Application Data

(63) Continuation of application No. 16/619,428, filed as application No. PCT/US2018/030073 on Apr. 30, 2018, now Pat. No. 11,431,198.

(30) Foreign Application Priority Data

Jun. 6, 2017 (IN) .............................. 201741019855

(51) Int. Cl.
*H02J 50/90* (2016.01)
*H02J 7/02* (2016.01)
(Continued)

(52) U.S. Cl.
CPC ................. *H02J 50/90* (2016.02); *H02J 7/02* (2013.01); *H02J 50/10* (2016.02); *H02J 50/40* (2016.02)

(58) Field of Classification Search
CPC ....................................................... H02J 50/90
(Continued)

(56) References Cited

U.S. PATENT DOCUMENTS 5,896,278 A * 4/1999 Tamura ................... H02J 50/12
363/20
2003/0075670 A1 4/2003 Tuominen
(Continued)

FOREIGN PATENT DOCUMENTS

| KR | 10-2011-0132604 | 12/2011 |
| KR | 10-1332163 | 11/2013 |
| WO | 2018226322 | 12/2018 |

OTHER PUBLICATIONS

"India Application No. 201741019855 Examination Report", Feb. 17, 2020, 6 pages.

(Continued)

*Primary Examiner* — Edward Tso
*Assistant Examiner* — Ahmed H Omar
(74) *Attorney, Agent, or Firm* — DeLizio, Peacock, Lewin & Guerra, LLP

(57) ABSTRACT

A wireless charging device is disclosed. The wireless charging device includes a transmitter detection coil configured to receive a first alternating current (AC) voltage signal having a characteristic associated with a receiver device. Also, the wireless charging device includes a control unit coupled to the transmitter detection coil and configured to detect the receiver device based on the characteristic of the first AC voltage signal. Further, the wireless charging device includes a driver unit coupled to the control unit and (Continued)

configured to convert a direct current (DC) voltage signal of an input power to a second AC voltage signal if the receiver device is detected. In addition, the wireless charging device includes a power transmission coil configured to wirelessly transmit the second AC voltage signal to the receiver device.

19 Claims, 4 Drawing Sheets

(51) Int. Cl.
*H02J 50/10* (2016.01)
*H02J 50/40* (2016.01)

(58) Field of Classification Search
USPC .......................................................... 320/108
See application file for complete search history.

(56) References Cited

U.S. PATENT DOCUMENTS

| | | |
|---|---|---|
| 2004/0145342 A1 | 7/2004 | Lyon |
| 2009/0180302 A1 | 7/2009 | Kawabe et al. |
| 2009/0230777 A1* | 9/2009 | Baarman .............. H04B 5/0037 |
| | | 307/104 |
| 2010/0270867 A1* | 10/2010 | Abe ........................ H02J 50/60 |
| | | 307/104 |
| 2012/0306269 A1 | 12/2012 | Kim et al. |
| 2013/0257365 A1 | 10/2013 | Redding |
| 2014/0354069 A1 | 12/2014 | Jung |
| 2015/0054355 A1 | 2/2015 | Ben-Shalom et al. |
| 2016/0118835 A1* | 4/2016 | Desai .................... H02J 50/402 |
| | | 320/108 |
| 2020/0153277 A1 | 5/2020 | Mohan et al. |

OTHER PUBLICATIONS

"PCT Application No. PCT/US2018/030073 International Preliminary Report on Patentability", Dec. 19, 2019, 11 pages.
"PCT Application No. PCT/US2018/030073 International Search Report and Written Opinion", Aug. 8, 2018, 13 pages.
"U.S. Appl. No. 16/619,428 Final Office Action", Jun. 11, 2021, 17 pages.
"U.S. Appl. No. 16/619,428 Office Action", Dec. 10, 2020, 13 pages.
"U.S. Appl. No. 16/619,428 Office Action", Sep. 30, 2021, 19 pages.

* cited by examiner

WIRELESS CHARGING DEVICE, A RECEIVER DEVICE, AND AN ASSOCIATED METHOD THEREOF

BACKGROUND

Embodiments of the present invention relate generally to wireless power systems and more particularly to wireless charging device, a receiver device, and an associated method thereof.

In general, power transfer systems are used to transfer electric power from a power source to one or more receiver devices, such as for example, mobile devices, biomedical devices, and portable consumer devices. The power transfer systems are contact based power transfer systems or wireless power transfer systems. A contact based power transfer system includes interconnecting wires used to transfer electric power from the power source to receiver devices. Such interconnecting wires may damage or corrode over a period of time. Further, interconnecting wires of a contact based power transfer system contributes to the overall weight of the system. Wireless power transfer systems may be desirable to transfer power from a power source to receiver devices.

Typically, in a conventional power transfer system, a charging device is used to convert an input electric power received from a power source to a transferrable electric power that is transmitted to charge one or more batteries in a receiver device. However, the charging device may continuously transmit the power even if the receiver device is not present. Such transmission of power results in power loss and affects efficiency of the charging device.

Therefore, there is a need for an enhanced wireless charging device, a receiver device, and a method for detecting receiver devices.

SUMMARY

In accordance with one embodiment of the present invention, a wireless charging device is disclosed. The wireless charging device includes a transmitter detection coil configured to receive a first alternating current (AC) voltage signal having a characteristic associated with a receiver device. Also, the wireless charging device includes a control unit coupled to the transmitter detection coil and configured to detect the receiver device based on the characteristic of the first AC voltage signal. Further, the wireless charging device includes a driver unit coupled to the control unit and configured to convert a direct current (DC) voltage signal of an input power to a second AC voltage signal if the receiver device is detected. In addition, the wireless charging device includes a power transmission coil coupled to the driver unit and configured to wirelessly transmit the second AC voltage signal to the receiver device.

In accordance with another embodiment of the present invention, a receiver device is disclosed. The receiver device includes a signal generating unit configured to generate a first alternating current (AC) voltage signal having a characteristic associated with the receiver device. Also, the receiver device includes a receiver detection coil coupled to the signal generating unit and configured to transmit the first AC voltage signal having the characteristic to a wireless charging device. Further, the receiver device includes a power reception coil configured to be magnetically coupled to the wireless charging device and receive input power having a second AC voltage signal in response to transmitting the first AC voltage signal to the wireless charging device.

In accordance with another embodiment of the present invention, a method for detecting a receiver device is disclosed. The method includes generating, by a signal generating unit, a first alternating current (AC) voltage signal having a characteristic associated with a receiver device. Also, the method includes transmitting, by a receiver detection coil, the first AC voltage signal having the characteristic to a wireless charging device. Further, the method includes receiving, by a power reception coil, input power having a second AC voltage signal in response to transmitting the first AC voltage signal to the wireless charging device.

In accordance with another embodiment of the present invention, a wireless power transfer system is disclosed. The wireless power transfer system includes at least one receiver device including a signal generating unit configured to generate a first alternating current (AC) voltage signal having a characteristic associated with the at least one receiver device. Also, the at least one receiver device includes a receiver detection coil coupled to the signal generating unit and configured to transmit the first AC voltage signal having the characteristic to a wireless charging device. Further, the wireless power transfer system includes the wireless charging device wirelessly coupled to the at least one receiver device and including a transmitter detection coil configured to receive the first alternating current (AC) voltage signal having the characteristic associated with the receiver device. Also, the wireless charging device includes a control unit coupled to the transmitter detection coil and configured to detect the receiver device based on the characteristic of the first AC voltage signal.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

As will be described in detail hereinafter, various embodiments of a system and a method for charging one or more receiver devices are disclosed. In particular, embodiments of the system and the method discloses detection of the receiver device prior to transmitting electric power to the receiver device. Additionally, the embodiments of the system and the method discloses detection of one or more foreign objects.

Unless defined otherwise, technical and scientific terms used herein have the same meaning as is commonly understood by one of ordinary skill in the art to which this specification belongs. The terms "first", "second", and the like, as used herein do not denote any order, quantity, or importance, but rather are used to distinguish one element from another. The use of terms "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, terms "circuit" and "circuitry" and "control unit" may include either a single component or a plurality of components, which are either active and/or passive and are connected or otherwise coupled together to provide the described function. In addition, the term operationally coupled as used herein includes wired coupling, wireless coupling, electrical coupling, magnetic coupling, radio communication, software based communication, or combinations thereof.

Figure 1:
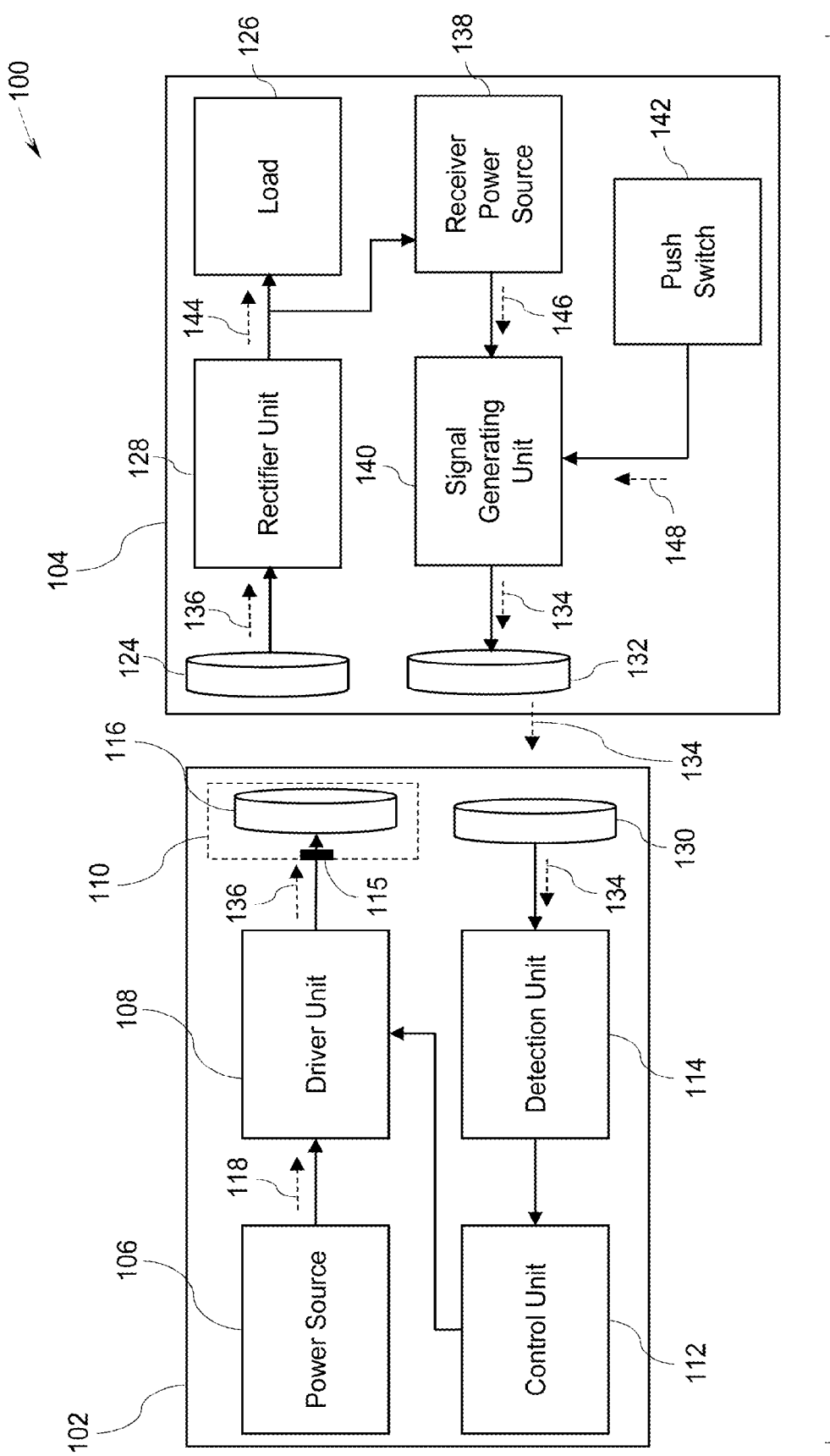
FIG. 1 a block diagram of a wireless power transfer system in accordance with an embodiment of the present invention.

FIG. 1 is a diagrammatical representation of a wireless power transfer system 100 in accordance with an embodiment of the present invention. The wireless power transfer system 100 includes a wireless charging device 102 and a receiver device 104. The wireless charging device 102 may include a power transmitting device, such as a power bank, a charging pad, or the like. The receiver device 104 may include a mobile device, a biomedical device, a portable consumer device, or the like. For ease of understanding, only one receiver device 104 is depicted in FIG. 1. In other embodiments, the wireless power transfer system 100 may include a plurality of receiver devices that are compatible with one of the wireless frequency standards. In one embodiment, the wireless frequency standards include a Power Matters Alliance (PMA) standard, an Air Fuel Alliance standard, a Qi standard, a Wireless Planning and Coordination (WPC) standard, and the like.

The wireless charging device 102 is configured to magnetically or wirelessly couple to the receiver device 104 to transmit electrical power to the receiver device 104. In one embodiment, the electric power may be in a range from about 0.1 W to about 3000 W. Further, the receiver device 104 is configured to receive the electric power from the wireless charging device 102 and supply the received electric power to one or more loads, such as batteries in the receiver device 104.

In a conventional power transfer system, a charging device may continuously transmit power even if a receiver device is not present at a proximate location, resulting in power loss and thereby affecting the efficiency of the charging device.

The exemplary wireless power transfer system 100 includes detection coils 130, 132 in the wireless charging device 102 and the receiver device 104 respectively. The detections coils 130, 132 aid in detecting the receiver device 104 before transmitting the electric power. The receiver device 104 may be detected at a location within a predetermined distance from the wireless charging device 102. In one embodiment, the predetermined distance may be in a range from about 5 mm to 500 mm. In particular, the detection coil 132 in the receiver device 104 transmits a first AC voltage signal 134 to the wireless charging device 102. The first AC voltage signal 134 is a low voltage signal that is used for detecting the receiver device 104. In one embodiment, the magnitude of the first AC voltage signal 134 is in a range from about 20 V to about 30 V. It may be noted herein that the detection coil 132 in the receiver device 104 may also be alternatively referred as a "receiver detection coil."

The detection coil 130 in the wireless charging device 102 receives the first AC voltage signal 134. It may be noted that the detection coil 130 in the wireless charging device 102 is alternatively referred to as a "transmitter detection coil." Further, the wireless charging device 102 detects the presence of the receiver device 104 based on one or more characteristics of the received first AC voltage signal 134. In one embodiment, the characteristics of the first AC voltage signal 134 include a frequency and a voltage associated with the receiver device 104. In another embodiment, the characteristic of the first AC voltage signal 134 may be representative of at least one of a frequency and a voltage associated with the receiver device 104. The voltage of the first AC voltage signal may be a peak voltage or a root mean square (RMS) voltage. The aspect of detecting the receiver device 104 is explained in greater detail in the below description.

The wireless charging device 102 includes a power source 106, a driver unit 108, a transmitting unit 110, a control unit 112, a detection unit 114, and the transmitter detection coil 130. The power source 106 is coupled to the driver unit 108 and used to supply input power having a DC voltage signal 118 to the driver unit 108. In some embodiments, the input power may be in a range from about 0.1 W to 3 KW. The magnitude of the DC voltage signal 118 may be in a range from about 20 V to about 500 V. It may be noted that the power source 106 may be positioned within the wireless charging device 102 or external to the wireless charging device 102.

The driver unit 108 is electrically coupled to the transmitting unit 110 and the control unit 112. Further, the driver unit 108 is configured to convert the DC voltage signal 118 to a second AC voltage signal 136 based on one or more control signals received from the control unit 112. The second AC voltage signal 136 is also referred to as a high power signal that is used for supplying electric power to a load 126, such as one or more batteries in the receiver device 104. In one embodiment, the magnitude of the second AC voltage signal 136 is in a range from about 250 V to about 450 V. The second AC voltage signal 136 is generated when the wireless charging device 102 is operating in a normal mode/a power transmission mode.

The transmitting unit 110 is configured to transmit the second AC voltage signal 136 received from the driver unit 108. In the exemplary embodiment, the transmitting unit 110 includes a resonant capacitor 115 and a power transmission coil 116 that resonates at a predefined frequency to transmit the second AC voltage signal 136 to the receiver device 104.

The receiver device 104 includes a power reception coil 124, a rectifier unit 128, the load 126, a receiver power source 138, a signal generating unit 140, the receiver detection coil 132, and a push switch 142. The power reception coil 124 is configured to receive the second AC voltage signal 136 from the power transmission coil 116 of the wireless charging device 102. The rectifier unit 128 is coupled to the power reception coil 124 and configured to convert the second AC voltage signal 136 to a DC load signal 144 which is further transmitted to the load 126. In one example, this DC load signal 144 may be used for charging the batteries in the receiver power source 138. In one embodiment, the load 126 and the receiver power source 138 may be a combined energy storage module.

In addition, the signal generating unit 140 is coupled to the receiver power source 138 and configured to receive electric power from the receiver power source 138. The signal generating unit 140 is further configured to generate the first AC voltage signal 134 based on a bias voltage 146 received from the receiver power source 138. In one embodiment, a user may manually switch ON the push switch 142 to send an activation signal 148 to activate the signal generating unit 140. Upon receiving the activation signal 148 from the push switch 142, the signal generating unit 140 generates the first AC voltage signal 134. It may be noted that the push switch 142 may be positioned internal or external to the receiver device 104. Further, the receiver detection coil 132 is coupled to the signal generating unit 140 and used to send the generated first AC voltage signal 134 from the signal generating unit 140 to the wireless charging device 102. It may be noted that although push switch 142 is used, in other embodiments, the signal generating unit 140 may be activated to generate the first AC voltage signal 134 by one or more other methods and/or devices. In one embodiment, the signal generating unit 140 may be activated by moving the receiver device 104 along a desired direction and placing the receiver device 104 on the wireless charging device 102. In another embodiment, the signal generating unit 140 may be activated based on a charge level in the load 126. If the charge level in the load 126 is less than a desired value, the signal generating unit 140 may be activated to generate the first AC voltage signal 134. In yet another embodiment, the signal generating unit 140 may include one or more wireless transceivers that may directly transmit the first AC voltage signal 134 to the detection unit 114 in the wireless charging device 102, using one or more short range communication techniques, such as Bluetooth and near field communication (NFC).

During operation, the wireless charging device 102 detects the receiver device 104 prior to transmitting the power to the receiver device 104. Particularly, when the receiver device 104 is located within the predetermined distance from the wireless charging device 102, the transmitter detection coil 130 receives the first AC voltage signal 134 from the receiver detection coil 132 of the receiver device 104. Further, the detection unit 114 is coupled to the transmitter detection coil 130 and configured to determine one or more characteristics of the received first AC voltage signal 134.

Further, the control unit 112 is coupled to the detection unit 114 and configured to detect the receiver device 104 based on the characteristics of the received first AC voltage signal 134. More specifically, if the receiver device 104 is within the predetermined distance from the charging device 102, the characteristics, such as the frequency and the voltage of the first AC voltage signal 134 are within corresponding predefined range. Specifically, the frequency of the first AC voltage signal 134 is within a predefined frequency range and the voltage of the received first AC voltage signal 134 is within a predefined voltage range, if the receiver device 104 is within the predetermined distance from the charging device 102.

When the receiver device 104 is detected, the control unit 112 drives the driver unit 108 to transmit the second AC voltage signal 136 via the transmitting unit 110 to the detected receiver device 104. If the characteristics, such as the frequency and the voltage of the first AC voltage signal 134 are not within the corresponding range, the control unit 112 determines that the receiver device 104 is not proximate or within the predetermined distance from the charging device 102. As a result, the control unit 112 controls the driver unit to stop the transmission of the second AC voltage signal 136. The aspect of detecting the receiver device 104 is explained in greater detail with reference to FIG. 2.

In one embodiment, the control unit 112 may also be used to detect one or more foreign objects that are proximate to the wireless charging device 102 based on the frequency and the voltage of the first AC voltage signal 134. More specifically, if a foreign object is proximate to the wireless charging device 102, the frequency and voltage of the first AC voltage signal 134 may be within a different range. The values of the frequency and voltage enables to determine that the object that is proximate to the wireless charging device 102 is a foreign object and not the receiver device 104. Thus, by employing the exemplary wireless charging device 102, the input power may be wirelessly transmitted after detecting the receiver device 104, which in turn reduces power loss in the wireless power transfer system 100 and thereby improve the efficiency of the wireless charging device 102. Further, the exemplary system and method facilitate to reduce electromagnetic interference (EMI) and thereby meet regulatory standards.

Figure 2:
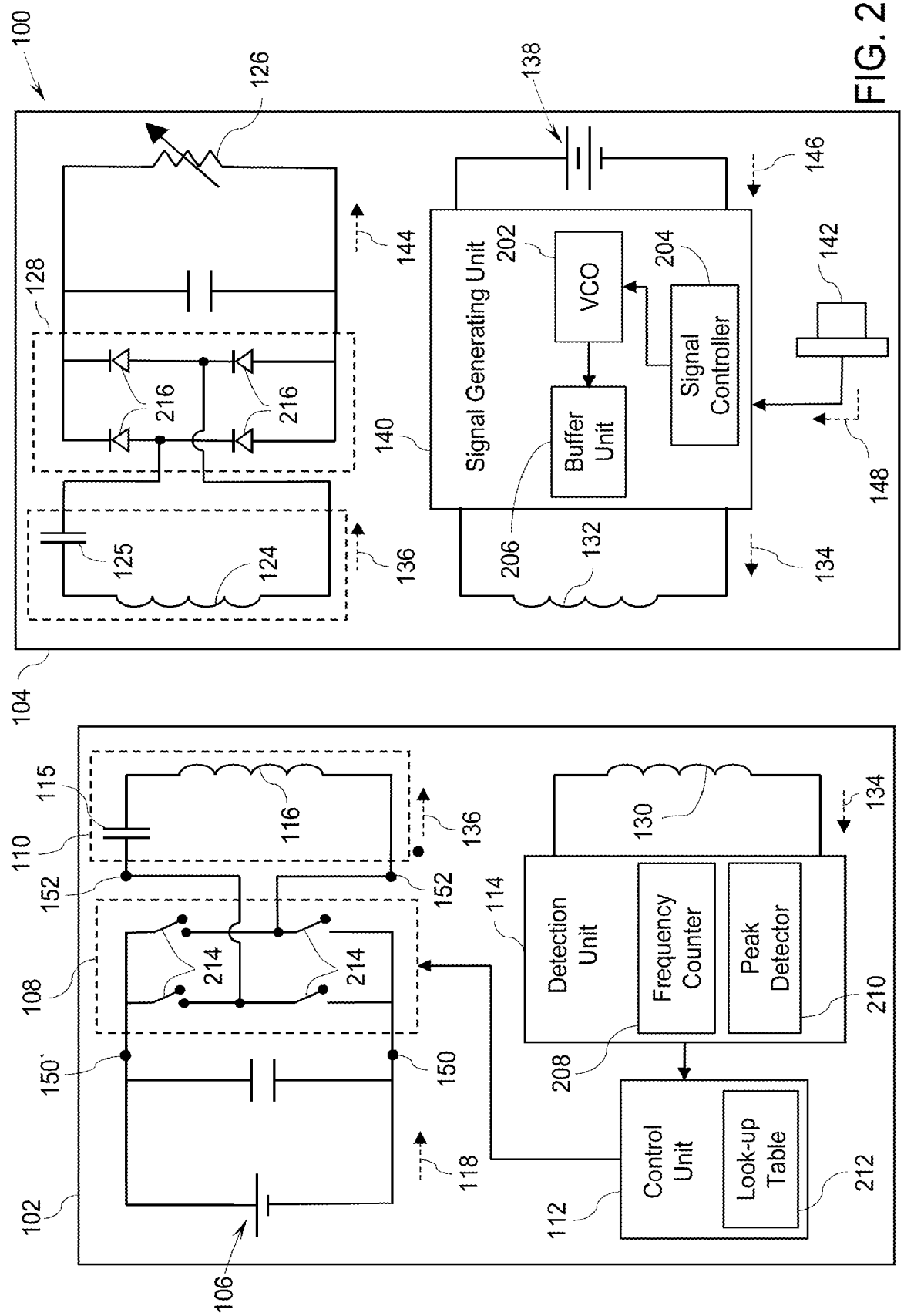
FIG. 2 is a detailed schematic representation of a wireless power transfer system in accordance with an embodiment of the present invention.

Referring to FIG. 2, a schematic representation of a wireless power transfer system 100 in accordance with the embodiment of FIG. 1. The wireless power transfer system 100 includes the wireless charging device 102 that is configured to be magnetically coupled to the receiver device 104.

The receiver detection coil 132 in the receiver device 104 is magnetically coupled to the transmitter detection coil 130 of the wireless charging device 102 if the receiver device 104 is located within a predetermined distance from the wireless charging device 102. Further, the signal generating unit 140 is configured to generate the first AC voltage signal 134 based on the DC voltage 146 received from the receiver power source 138 in the receiver device 104. In one embodiment, the DC voltage 146 is used as a bias voltage for the signal generating unit 140 to generate the first AC voltage signal 134. In the illustrated embodiment, the signal generating unit 140 includes a voltage controlled oscillator (VCO) 202, a signal controller 204, and a buffer unit 206. The VCO 202 is electrically coupled to the signal controller 204 and the buffer unit 206. The VCO 202 is pre-tuned or designed to oscillate at a first frequency that is associated with the receiver device 104. Further, the signal controller 204 activates the VCO 202 when the activating signal 148 is received. Upon activating the VCO 202, the VCO 202 receives the bias or DC voltage 146 from the receiver power source 138 and oscillates at the first frequency to convert the received bias or DC voltage 146 to the first AC voltage signal 134 having the first frequency. The buffer unit 206 is used to step-up the power level of the first AC voltage signal 134 before transmitting the first AC voltage signal 134 to the receiver detection coil 132.

In one embodiment, the user presses the push switch/button 142 that is coupled to the signal generating unit 140, to transmit the activating signal 148 to activate the signal generating unit 140 to generate the first AC voltage signal 134. In one embodiment, the activating signal 148 is transmitted to the signal controller 204 in the signal generating unit 140. It may be noted that although push switch/button 142 is used, in other embodiments, the signal generating unit 140 may be activated by one or more other type of devices.

Further, the signal generating unit 140 transmits the first AC voltage signal 134 to the wireless charging device 102 via the receiver detection coil 132. In particular, the receiver detection coil 132 is magnetically coupled to the transmitter detection coil 130 to transmit the first AC voltage signal 134 to the transmitter detection coil 130. Further, the detection unit 114 that is coupled to the transmitter detection coil 130, receives the first AC voltage signal 134 from the transmitter detection coil 130. The detection unit 114 determines one or more characteristics of the first AC voltage signal 134. In one embodiment, the characteristics of the first AC voltage signal 134 includes a frequency and a voltage, such as peak voltage and root mean square (RMS) voltage of the first AC voltage signal 134. In one embodiment, the detection unit 114 measures a voltage drop across the transmitter detection coil 130. The voltage drop may be referred to as the voltage of the first AC voltage signal 134. The detection unit 114 includes a frequency counter 208 and a peak detector 210 that are electrically coupled to the transmitter detection coil 130. When the transmitter detection coil 130 receives the first AC voltage signal 134, the frequency counter 208 determines the frequency of the first AC voltage signal 134, while the peak detector 210 determines the voltage of the first AC voltage signal 134. In one embodiment, the peak detector 210 measures the peak voltage of the first AC voltage signal 134.

Further, the control unit 112 compares the determined characteristics with pre-stored characteristics. More specifically, the control unit 112 may include a look-up table 212 having the pre-stored characteristics of one or more receiver devices. In one embodiment, the characteristics may include frequency and voltage values of the receiver device 104. If the determined characteristics is same or proximate to the pre-stored characteristics, the control unit 112 detects the presence of the receiver device 104. In one embodiment, the control unit 112 may include one or more comparators to compare the characteristics of the first AC voltage signal 134 with the pre-stored characteristics. In one embodiment, the control unit 112 may verify whether at least one of the characteristics is within a predefined range. More specifically, the control unit 112 may determine whether the frequency of the first AC voltage signal 134 is within a predefined frequency range. In another embodiment, the control unit 112 may determine whether the voltage of the first AC voltage signal 134 is within a predefined voltage range.

Further, the control unit 112 drives the driver unit 108 to transmit electric power to the detected receiver device 104. In particular, the control unit 112 sends one or more control signals to the driver unit 108 to convert the DC voltage signal 118 from the power source 106 to the second AC voltage signal 136. In one embodiment, the control unit 112 may include a pulse width modulator (PWM) to send control signals to the driver unit 108. In one embodiment, the driver unit 108 includes a plurality of electronic switches 214 that are arranged to form a bridge circuit between first terminals 150 and second terminals 152 of the driver unit 108. The switches 214 are activated and deactivated based on the control signals received from the control unit 112 to convert the DC voltage signal 118 to the second AC voltage signal 136. The frequency of the second AC voltage signal 136 is based on a frequency of the control signals transmitted to the driver unit 108. The frequency of the second AC voltage signal 136 is selected based on a frequency standard of the detected receiver device 104. In one embodiment, the first AC voltage signal 134 received from the receiver device 104 may include frequency information related to the frequency standard of the receiver device 104. This frequency information may be used by the control unit 112 to operate the driver unit 108 at a corresponding frequency for transmitting the second AC voltage signal 136 to the receiver device 104.

The resonant capacitor 115 and the power transmission coil 116 in the transmitting unit 110 may resonate at a predefined frequency or a resonant frequency to transmit the second AC voltage signal 136 to the power reception coil 124 in the receiver device 104. Further, the power reception coil 124 and a resonant capacitor 125 in the receiver device 104 transmits the received second AC voltage signal 136 to the rectifier unit 128. The rectifier unit 128 converts the second AC voltage signal 136 to the DC load signal 144, which is further transmitted to the load 126. In one embodiment, the rectifier unit 128 includes a plurality of diodes 216 that are arranged to form a bridge circuit. The rectifier unit is configured to convert the second AC voltage signal 136 to the DC load signal 144, which is further transmitted to the load 126. The DC load signal 144 may be used for charging the batteries in the receiver power source 138.

Figure 3:
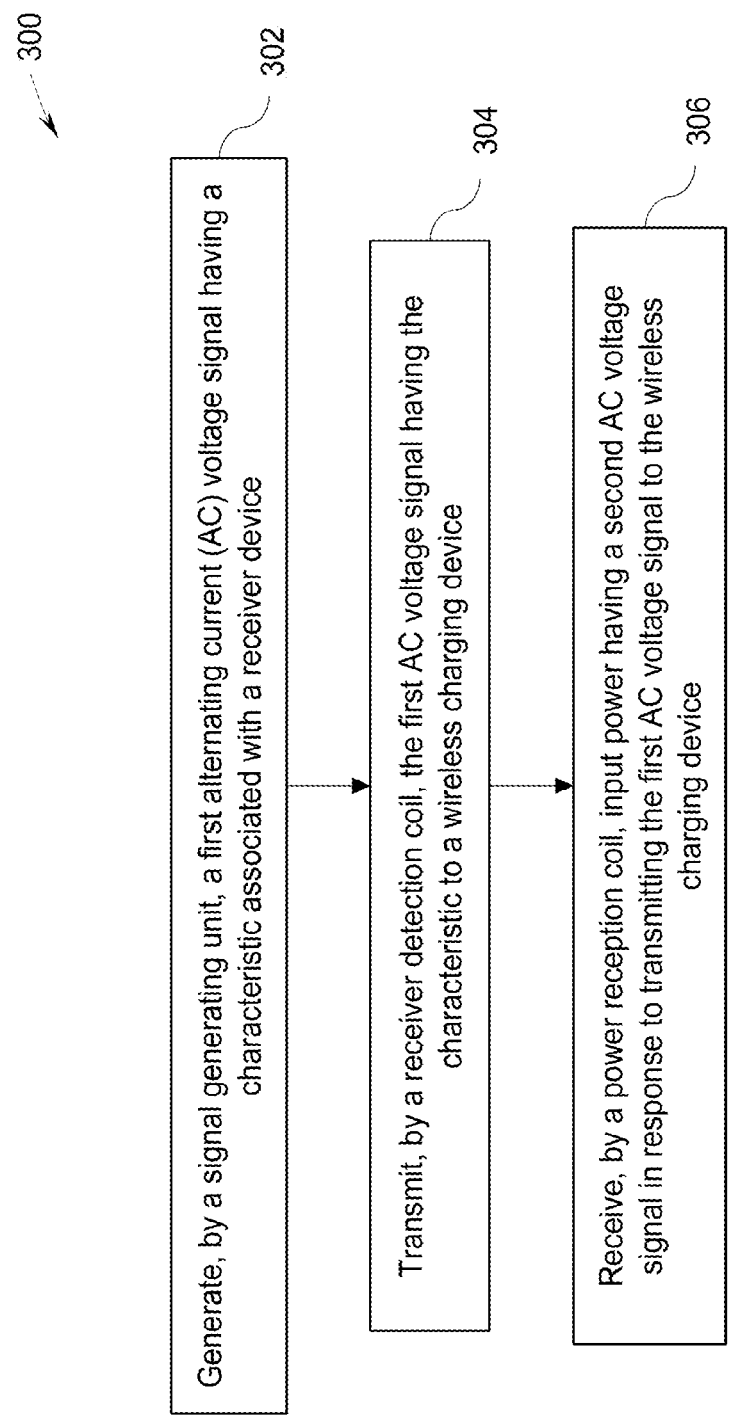
FIG. 3 is a flow chart illustrating a method for indicating a presence of a receiver device and receiving electric power from a wireless charging device in accordance with embodiments of the present invention.

Referring to FIG. 3, a flow chart illustrating a method 300 for indicating a presence of a receiver device and receiving electric power from a wireless charging device in accordance with certain embodiments of the present invention is depicted. At step 302, a signal generating unit generates a first AC voltage signal having a characteristic associated with a receiver device. In one example, the characteristic includes a frequency and a voltage associated with the receiver device. In one embodiment, the signal generating unit generates the first AC voltage signal when a push switch is manually pressed or switched ON by a user.

Subsequently, at step 304, the first AC voltage signal is transmitted to a wireless charging device. To that end, a receiver detection coil in the receiver device transmits the first AC voltage signal having the characteristic to a transmitter detection coil in the wireless charging device. In particular, the first AC voltage signal is transmitted to the wireless charging device to indicate the presence of the receiver device to the wireless charging device. In one embodiment, the receiver and transmitter detection coils are used as dedicated coils for communicating signals that aid in detecting the receiver device.

At step 306, the input power having a second AC voltage signal is received in response to transmitting the first AC voltage signal from the receiver device to the wireless charging device. A power reception coil receives the second AC voltage signal from a power transmission coil of the wireless charging device. In particular, the detection unit determines one or more characteristics from the first AC voltage signal received from the receiver device. The characteristics may include frequency and voltage values of the first AC voltage signal. Further, the control unit that is coupled to the detection unit, verifies whether the determined characteristics are within their corresponding predefined range. For example, the control unit may verify whether the frequency of the first AC voltage signal is within a pre-defined frequency range. Similarly, the control unit may determine whether the voltage of the first AC voltage signal is within a pre-defined voltage range.

Further, the control unit detects the receiver device, if the characteristics of the first AC voltage signal are within their corresponding pre-defined range. The control unit activates the driver unit to transmit electric power to the receiver device. In one embodiment, the control unit sends one or more control signals to the driver unit to convert the DC voltage signal to the second AC voltage signal. Further, the converted second AC voltage signal is transmitted to the receiver device via the power transmission coil.

The second AC voltage signal is received by the power reception coil in the receiver device. Further, the rectifier unit coverts this second AC voltage signal to a DC load signal for charging the load, such as one or more batteries in the receiver device.

Figure 4:
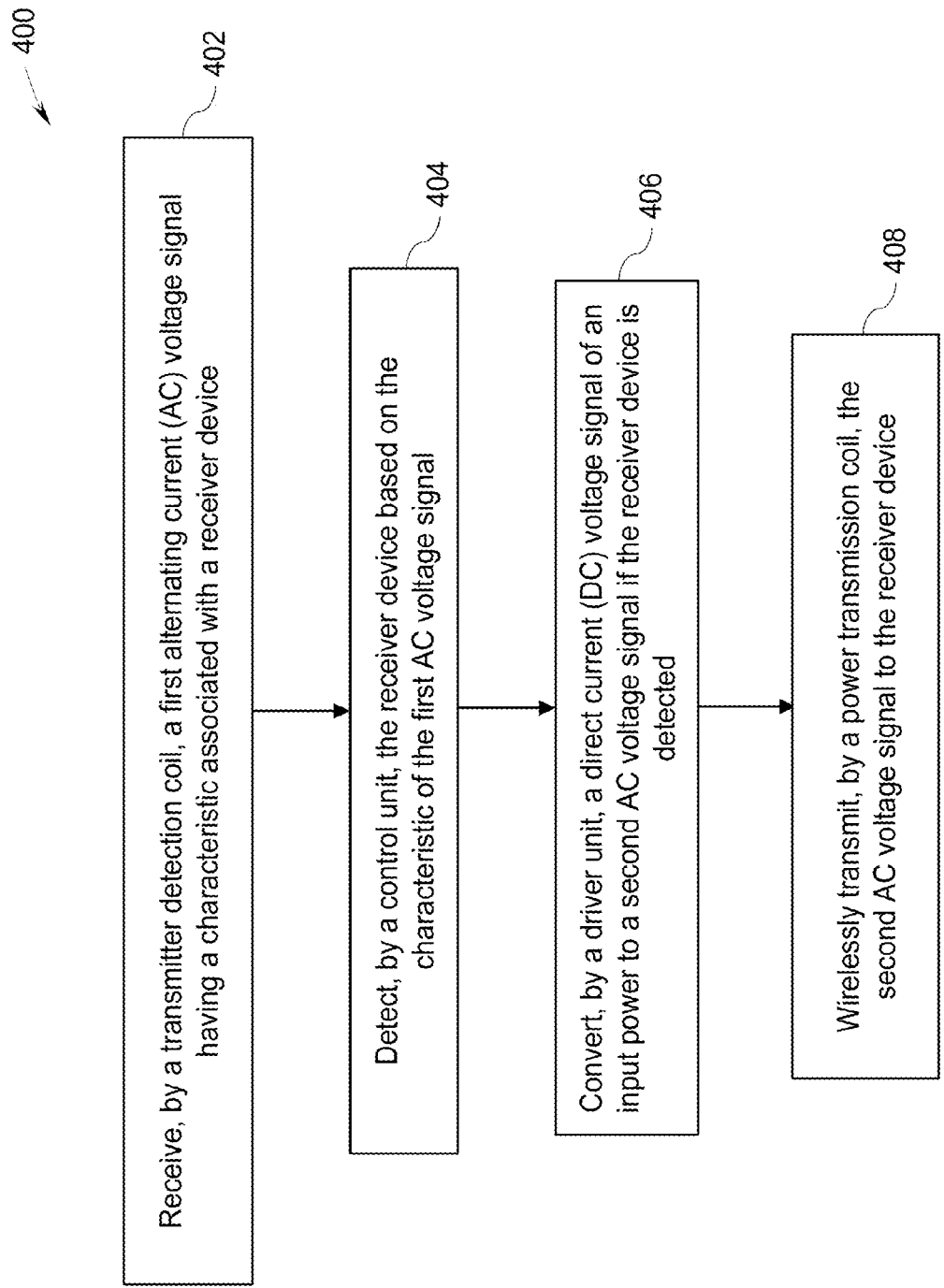
FIG. 4 is a flow chart illustrating a method for detecting a receiver device in accordance with embodiments of the present invention.

FIG. 4 is a flow chart illustrating a method 400 for detecting a receiver device in accordance with embodiments of the present invention. At step 402, a first AC voltage signal having a characteristic associated with the receiver device is received by a transmitter detection coil of a wireless charging device. In one example, the characteristic includes a frequency and a voltage associated with the receiver device. In another example, the characteristic may be representative of a frequency and/or a voltage associated with the receiver device. In particular, the transmitter detection coil is magnetically coupled to a receiver detection coil in the receiver device. Further, the transmitter detection coil receives the first AC voltage signal from the receiver detection coil.

Subsequently, at step 404, the receiver device is detected by a control unit based on the characteristic of the first AC voltage signal. More specifically, if the receiver device is within the predetermined distance from the wireless charging device, the characteristics, such as the frequency and the voltage of the first AC voltage signal are within corresponding predefined range. Specifically, the frequency of the first AC voltage signal is within a predefined frequency range and the voltage of the received first AC voltage signal is within a predefined voltage range, if the receiver device is within the predetermined distance from the charging device. If the characteristics, such as the frequency and the voltage of the first AC voltage signal are within the corresponding range, the control unit determines that the receiver device is proximate or within the predetermined distance from the charging device.

Furthermore, at step 406, a DC voltage signal of an input power is converted to a second AC voltage signal by a driver unit if the receiver device is detected. In particular, if the receiver device is detected, the control unit transmits one or more control signals to the driver unit to convert the DC voltage signal from the power source to the second AC voltage signal.

In addition, at step 408, the second AC voltage signal is wirelessly transmitted to the receiver device by a power transmission coil. More specifically, a resonant capacitor and the power transmission coil in the transmitting unit may resonate at a predefined frequency or a resonant frequency to transmit the second AC voltage signal to a power reception coil in the receiver device. Further, the power reception coil and a resonant capacitor in the receiver device transmits the received second AC voltage signal to the rectifier unit. The rectifier unit converts the second AC voltage signal to the DC load signal, which is further transmitted to the load.

In accordance with the exemplary embodiments discussed herein, the exemplary system and method facilitate to detect the receiver device. In particular, the system and method disclosed herein allow charging devices, such as power banks to transmit power only after detecting the receiver device. As a result, power loss is reduced and efficiency of the charging devices is enhanced. Further, the exemplary system and method disclosed herein enable detection of any foreign objects. Further, the exemplary system and method facilitate to reduce electromagnetic interference (EMI) and thereby meet regulatory standards.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

What is claimed is:

1. A wireless power transmitter comprising:
a detection coil configured to receive a first signal from a signal generating unit of a receiver device prior to transmission of wireless power from the wireless power transmitter to the receiver device;
a power transmission coil configured to transmit an alternating current (AC) voltage signal as wireless power to the receiver device after the receiver device is detected by a control unit;
a driver unit configured to provide the AC voltage signal to the power transmission coil; and
the control unit coupled to the detection coil and configured to:
determine a distance of the receiver device based on a voltage or frequency of the first signal being within a voltage range or a frequency range, respectively, and
initiate the transmission of the wireless power via the power transmission coil when the distance of the receiver device is within a threshold distance of the wireless power transmitter.

2. The wireless power transmitter of claim 1, wherein the receiver device is detected before the power transmission coil transmits the wireless power to the receiver device.

3. The wireless power transmitter of claim 1, further comprising a detection unit coupled to the detection coil and configured to determine the frequency or the voltage of the first signal.

4. The wireless power transmitter of claim 1, wherein the control unit is configured to:
compare a frequency or a voltage of the first signal with a pre-stored characteristic; and
detect the receiver device is within the threshold distance of the wireless power transmitter when the frequency or voltage of the first signal is within a range of the pre-stored characteristic.

5. The wireless power transmitter of claim 4, wherein the control unit is configured to activate the driver unit to provide the AC voltage signal after the receiver device is detected.

6. The wireless power transmitter of claim 1, wherein the control unit is configured to detect one or more foreign objects proximate to the receiver device when the first signal is outside of a voltage range.

7. A receiver device comprising:
a signal generating unit configured to cause transmission of a first signal before receiving wireless power from to a wireless power transmitter, wherein the first signal enables the wireless power transmitter to determine a distance of the receiver device based on a voltage or frequency of the first signal being within a voltage range or a frequency range, respectively, at the wireless power transmitter; and
a power reception coil configured to receive an alternating current (AC) voltage signal as wireless power from the wireless power transmitter in response to the first signal when the distance of the receiver device is within a threshold distance of the wireless power transmitter.

8. The receiver device of claim 7, further comprising a rectifier unit configured to convert the AC voltage signal to a direct current (DC) voltage signal and provide the DC voltage signal to at least one load associated with the receiver device.

9. The receiver device of claim 8, further comprising a receiver power source configured to transmit a bias voltage to the signal generating unit, wherein the bias voltage is used by the signal generating unit to generate the first signal.

10. The receiver device of claim 9, wherein the receiver power source is charged by the DC voltage signal received from the wireless power transmitter.

11. The receiver device of claim 7, further comprising a push switch or button configured to activate the signal generating unit.

12. The receiver device of claim 7, wherein the signal generating unit is activated based on a charge level in a load associated with the receiver device.

13. The receiver device of claim 7, wherein the signal generating unit is activated when the receiver device is moved in a first direction or when the receiver device is placed in proximity to the wireless power transmitter.

14. The receiver device of claim 7, further comprising a receiver detection coil configured to transmit the first signal.

15. The receiver device of claim 7, further comprising one or more wireless transceivers coupled with the signal generating unit and configured to transmit the first signal via a short range radio communication.

16. A method of a receiver device for wireless charging, comprising:
generating, by a signal generating unit of the receiver device, a first signal before receiving wireless power from a wireless power transmitter, wherein the first signal enables a wireless power transmitter to determine a distance of the receiver device based on a voltage or frequency of the first signal being within a voltage range or a frequency range, respectively, at the wireless power transmitter;
transmitting the first signal to the wireless power transmitter; and
receiving, by a power reception coil of the receiver device, an alternating current (AC) voltage signal as wireless power from the wireless power transmitter in response to the first signal having when the distance of the receiver device is within a threshold distance of the wireless power transmitter.

17. The method of claim 16, further comprising supplying, by a receiver power source, a bias voltage to the signal generating unit to generate the first signal.

18. The method of claim 17, further comprising:
converting the AC voltage signal to a direct current (DC) voltage signal;
providing the DC voltage signal to at least one load associated with the receiver device; and
charging the receiver power source by the DC voltage signal.

19. The method of claim 16, further comprising activating the signal generating unit to generate the first signal in association with activation of a push switch or button of the receiver device.

* * * * *